May 28, 1968 R. KEMMETMUELLER 3,385,584
CRANELESS STEEL PLANT
Filed March 12, 1965 4 Sheets-Sheet 3

INVENTOR
ROLAND KEMMETMUELLER
BY
Steinberg + Blake
ATTORNEYS

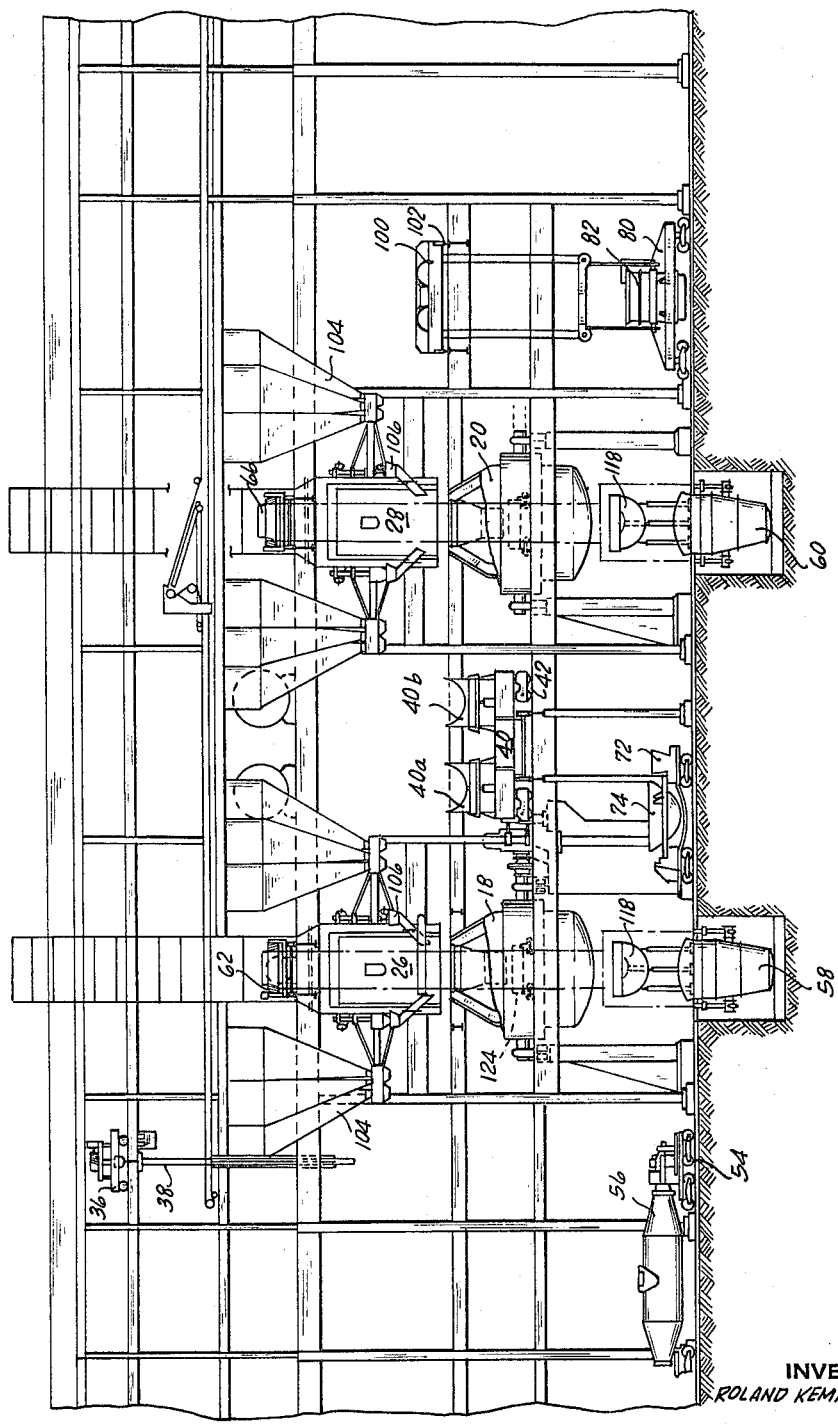

United States Patent Office 3,385,584
Patented May 28, 1968

3,385,584
CRANELESS STEEL PLANT
Roland Kemmetmueller, Pittsburgh, Pa., assignor to
Waagner-Biro AG, Vienna, Austria
Filed Mar. 12, 1965, Ser. No. 439,277
10 Claims. (Cl. 266—13)

ABSTRACT OF THE DISCLOSURE

A craneless steel plant wherein a converter is situated between a charging aisle which extends longitudinally of the plant on one side of the converter and a teeming aisle which extends longitudinally of the plant parallel to the charging aisle and on the opposite side of the converter. A plurality of car rails are situated in both of the aisles, and all of the car rails which are situated in these aisles extend exclusively longitudinally thereof, so that in this way the aisles do not have any car rails which extend transversely of the aisles. The plurality of rails include a torpedo car rail in the charging aisle for guiding a torpedo car which delivers pig iron to a charging ladle and a slag car rail in the charging aisle for guiding slag cars which receive slag from the converter to transport the slag out of the plant. The plurality of rails in the teeming aisle include steel car rails for guiding cars which carry teeming ladles for movement longitudinally of the teeming aisles and mold car rails for guiding mold-carrying cars for movement longitudinally of the teeming aisle. A stationary trolley rail is situated over and extends transversely of the charging aisle, and a trolley carried thereby transports a charging ladle to and from the converter, while a stationary trolley rail which is situated over and extends transversely of the teeming aisle carries a trolley for transporting a teeming ladle from a steel car toward and away from a mold car.

---

The present invention relates to steel plants.

More particularly, the present invention relates to that type of steel plant where steel is derived from molten metals and other ingredients which are refined in converters such as those which operate according to the well-known basic oxygen process.

As is well known, in steel plants of this type the converter is charged with molten pig iron as well as with scrap metal and suitable fluxing ingredients. After oxygen is blown onto the molten charge within the converter for a given length of time, the slag is poured off the top of this molten charge of the converter, and then the steel is poured off and delivered either to ingot molds or to a continuous casting machine.

Steel plants of this type are tremendously expensive not only from the standpoint of the initial costs which are encountered in setting up the steel plant but also from the standpoint of maintaining the steel plant in operation. Some of the most costly items in the steel plant are the cranes therein. A number of such cranes are required. For example when operating with two converters, at least three cranes will be required, and where each converter has a capacity of 300 tons, each crane must have a capacity of from 350 to 375 tons, and cranes of this type cost on the order of 1.2 millions of dollars. Moreover, these cranes require considerable maintenance, to the extent that at any given time one crane may simply be out of usable condition and in repair.

Moreover, other operations of a conventional steel plant of this type are highly time-consuming and costly. Thus, steel plants of the above type conventionally include transfer cars in the charging aisle for transporting slag from the converter to a crane which raises a slag pot from the transfer car and delivers the slag pot to a slag car which runs out of the building. Much the same type of operations are encountered in the teeming aisle where the steel is delivered from the converter into the teeming ladle on a transfer car which then travels across the teeming aisle where a crane raises the teeming ladle and delivers it to molding stands, for example.

One of the primary objects of the present invention is to provide a steel plant which is far less expensive than conventional steel plants both with respect to the initial cost of the plant and the operation thereof.

In particular, it is one of the important objects of the present invention to provide a steel plant of the above type which does not require any cranes, so that there is in this way a saving of several millions of dollars.

Furthermore, it is an object of the present invention to provide a steel plant which requires no transfer cars which must move transversely of the charging aisle and teeming aisle, so that in this way the operation of the plant is less time-consuming and costly, as compared to a conventional steel plant.

The objects of the present invention also include the provision of a steel plant in which all cars can travel in only one direction in the plant, so as to greatly simplify the construction and operation thereof.

Furthermore, it is an object of the present invention to provide a plant which requires only trolleys operating on stationary rails for the purpose of transporting ladles in the charging aisle and in the teeming aisle.

The steel plant of the present invention includes parallel charging and teeming aisles between which a converter is situated. A plurality of car rails are situated in each of these aisles, and all of these car rails extend only longitudinally of the aisles, so that the charging and teeming aisles of the plant of the present invention does not have any car rails which extend transversely of the aisles. In the charging aisle is a torpedo car rail which guides a torpedo car which delivers pig iron to a charging ladle, and situated over the charging aisle is a stationary rail means carrying a trolley means which is capable of raising the ladle charged with pig iron to deliver the pig iron therefrom into the converter. Also situated in the charging aisle is a slag car rail which guides a slag car carrying a slag pot into which slag is delivered from the converter when the latter is tilted toward the charging aisle, the slag flowing, in accordance with one feature of the invention, into a slag runner which delivers the slag directly into the pot of the slag car which can then simply transfer the slag out of the plant, so that no transfer cars are required in connection with the slag transportation. In the teeming aisle of the plant of the invention are located rails for the steel cars which carry the teeming ladles and rails for the mold cars which carry the ingot molds, and the converter can be tilted toward the teeming aisle to deliver steel directly into a teeming ladle on a steel car which is then capable of traveling along one steel car rail out of the plant and then back into the plant along another steel car rail which is situated between a pair of mold car rails. Over the latter pair of mold car rails and the steel car rails situated therebetween is a stationary rail means carrying a second trolley means capable of raising the teeming ladle from the steel car to transport it either to a mold car on one mold car rail or to a mold car on the other mold car rail. Thus, it will be seen that with the structure of the invention not only are there no transfer cars which are required to travel transversely of the charging or teeming aisles, but in addition no cranes are required, and all of the raising of ladles is carried out by simple relatively inexpensive trolleys which travel exclusively on stationary rails.

The invention is illustrated by way of example in the accompanying drawings, in which:

FIG. 4 is a fragmentary schematic longitudinal elevation of the plant taken along line 4—4 of FIG. 2 in the direction of the arrows.

Figure 1:
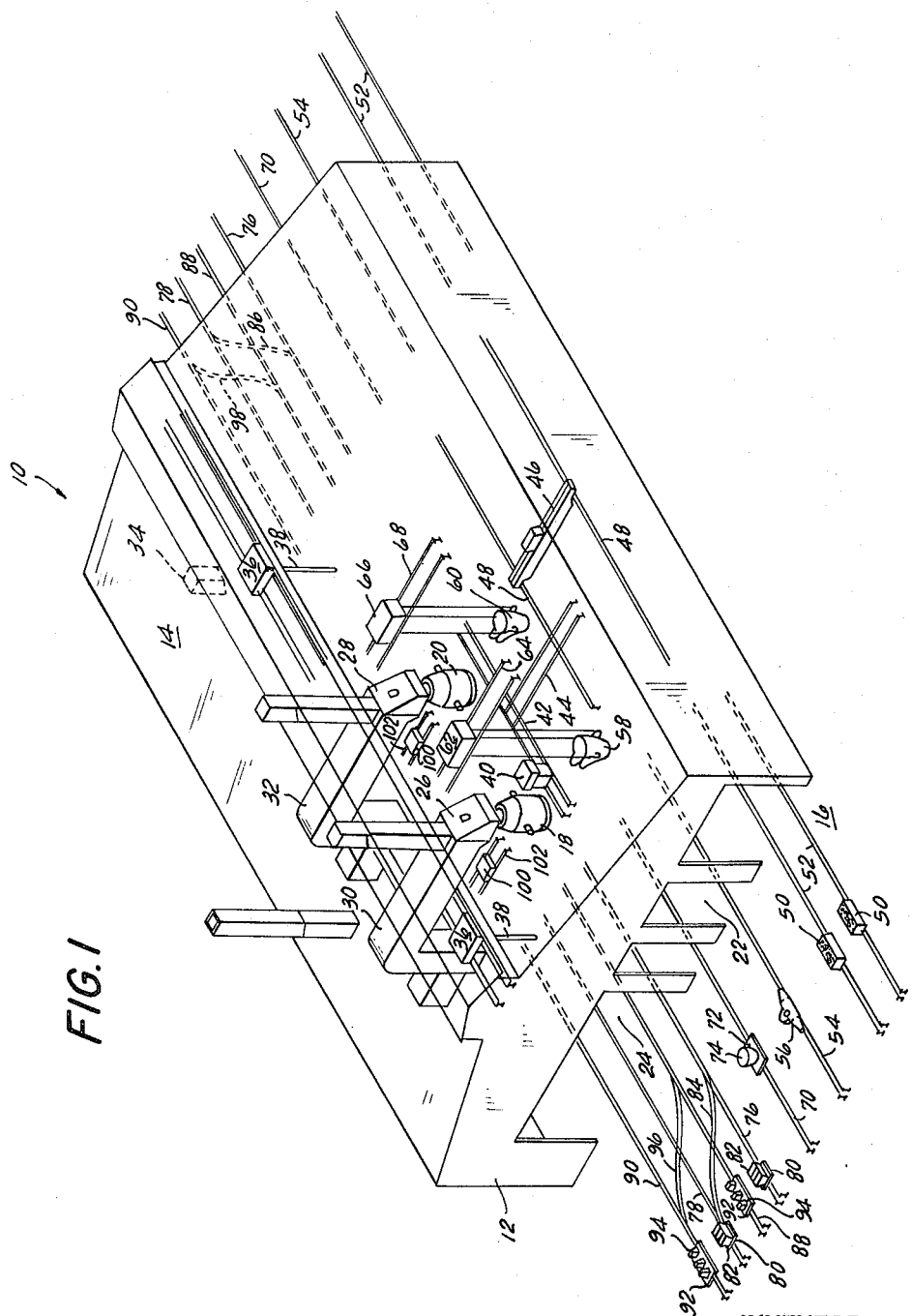
FIG. 1 is a schematic perspective illustration of one possible plant structure according to the present invention.

Referring now to FIG. 1, the schematically illustrated steel plant 10 of the present invention illustrated therein includes a building 12 of any suitable construction for housing the steel plant of the invention. The building 12 has a roof structure 14 part of which extends over the scrap yard 16 which is situated outside of and beside the steel plant proper.

Within the building 12 are a pair of converter vessels 18 and 20 of conventional construction forming no part of the present invention. On one side of these converters is the elongated charging aisle 22 which extends longitudinally through the plant, and on the other side of the converters is the elongated teeming aisle 24 which also extends longitudinally through the plant and which is parallel to the charging aisle 22. Converter hoods 26 and 28 of conventional construction are situated respectively over the converters 18 and 20 to receive gases therefrom, and the units 30 and 32 which also form no part of the present invention receive the gases from the hoods 26 and 28, respectively, so as to clean these gases and so as to extract heat therefrom in a well known manner, FIG. 1 showing stacks oft he units 30 and 32 as well as the outline thereof. When the building 12 is originally constructed it may be large enough to include an eventual third converter and all of the structure associated therewith, as indicated by the dotted-line representation of a stack 34. Extending along an upper part of the roof 14 beneath the latter is a suitable rail assembly carrying in a well known manner trolleys 36 which support lances 38 capable of being introduced through the hoods 26 and 28 into the converters for blowing oxygen into the latter during refining of the charges therein, as is well known.

Scrap is charged into one or the other of the converters by means of a scrap-charging machine 40 which in accordance with one feature of the invention is guided for movement by a rail means which includes a rail portion 42 extending parallel to and situated over the charging aisle 22 and a rail portion 44 which extends transversely across the charging aisle 22 over the latter, this rail portion 44 being perpendicular to and intersecting the rail portion 42. At any given time only one of the converters 18 and 20 will be used while the other converter will be idle so that repairs thereof, if required, may be carried out at this time.

Scrap is delivered to the scrap charging machine 40 by means of a crane 46 which is situated in the scrap yard 16 beyond the plant proper, and the crane 46 is guided for movement by rails 48 and takes scrap from the scrap cars 50 and loads this scap onto the charging machine 40. The scrap cars 50 are guided for movement by rails 52 which it will be noted extend only longitudinally through the part of the scrap yard 16 which is situated beside the plant 10.

Extending longitudinally of the charging aisle 22 is a torpedo car rail 54, and it will be noted that this rail only extends longitudinaly through the plant along the charging aisle. A torpedo car 56 which in a known way can receive pig iron from a blast furnace or cupola transports pig iron into the plant, and the pig iron is poured from the torpedo car 56 into the charging ladle 58 in the event that the vessel 18 is operating or into the charging ladle 60 in the event that the vessel 20 is operating. A trolley means 62 includes suitable winches and cables thereon for raising and tilting the ladle 58, and this trolley 62 rides only on stationary rails 64 situated over and extending transversely of the charging aisle 22. Thus, it will be noted that no cranes are required in connection with charging the vessel 18 with molten pig iron. The trolley 62 raises the ladle 58, moves it toward the vessel 18 which in a known way is tilted toward the charging aisle to receive the charge of pig iron, after which the converter 18 returns to its upright position. In much the same way, when the converter 20 is used, the trolley 66 will operate the charging ladle 60, and this trolley 66 rides only on the stationary rails 68 which are situated over and extend transversely of the charging aisle 22.

The slag is delivered from the plant by way of a single slag car rail 70 which also extends only longitudinally of the charging aisle 22 through and beyond the plant 10. Slag cars 72 ride along the rail means 70 and carry the slag pots 74 which receive the slag from that one of the vessels 18 and 20 which happens to be operating.

A pair of parallel steel car rails 76 and 78 extend longitudinally along the teeming aisle 24 through and beyond the plant 10, and these rails 76 and 78 are adapted to support for movement steel cars 80 which carry teeming ladles 82. The pair of steel car rails 76 are interconnected beyond one end of the building 12 by a connecting rail means 84 and beyond the other end of the building 12 by a connecting rail means 86. Thus, a steel car 80 can move along the rail 76 to position the teeming ladle 82 for receiving steel from one or the other of the vessels 18 and 20, whereupon the car can continue to travel in the same direction out the other end of the building 12 along the connecting rail 86 to the other steel rail 78 and then back along the latter into the plant so as to become situated between the pair of mold car rails 88 and 90 which also extend longitudinally through the plant in only one direction along the teeming aisle 24. In this way a steel car 80 can become situated between the pair of rails 88 and 90 which carry the mold cars 92 on which the ingot molds 94 are mounted. The mold car rails 88 and 90 are interconnected beyond one end of the building by a connecting rail 96 and beyond the other end of the building by a connecting rail 98, so that any mold car can be moved out of the building and along one of the connecting rails 96 or 98 to be transported between the rails 88 and 90. A pair of trolleys 100 are respectively guided for movement only by a pair of stationary rails 102, respectively, each of which extends transversely across the teeming aisle 24 over the steel car rail 78 and the mold car rails 88 and 90. Thus, when the converter 18 is operating the left trolley 100 of FIG. 1 may be used to raise a teeming ladle from a steel car on the rail 78 and move it either to an ingot mold at the rail 90 or to an ingot mold at the rail 88, and similar operations may be performed with the other trolley 100 when the converter 20 is operating.

Figure 2:
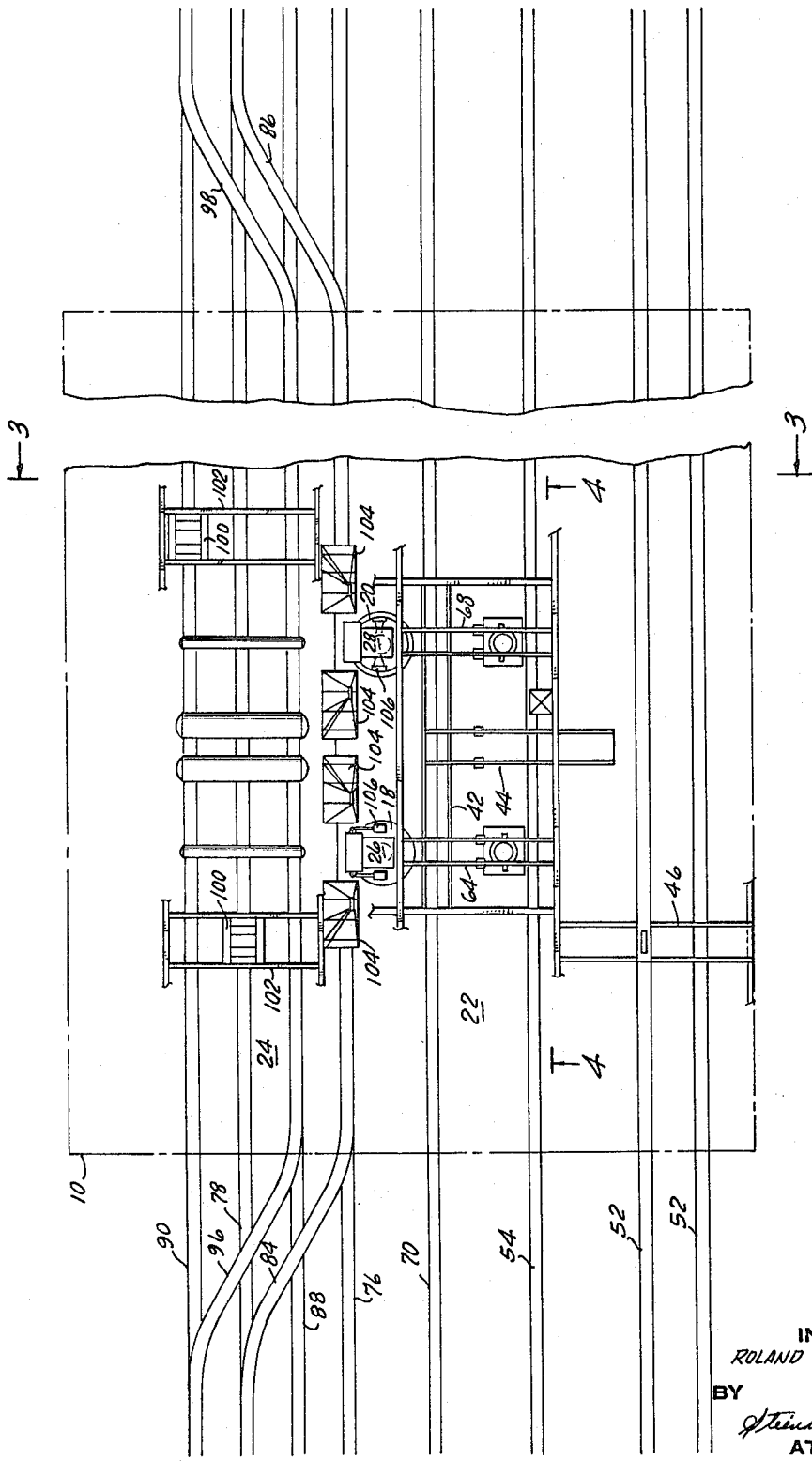
FIG. 2 is a schematic top plan view of the plant of FIG. 1, showing in particular the layout of the rails therein.

Referring to FIG. 2, the layout of the various rails is illustrated therein. The plant proper 10 has the outline indicated by the dot-dash line rectangular area. It will be noted that all of the rails 54, 70, 76, 88, 78 and 90 extend only longitudinally through the plant, and that the charging aisle 22 and teeming aisle 24 do not have any transversely extending car rails. In fact, the connecting rails 84 and 96 and 86 and 98 are all situated at the exterior of the building 10. The location of the rail portions 42 and 44 for the scrap-charging machine is also apparent from FIG. 2 which indicates the crane 46 situated over the scrap car rails 52. The situation of the trolley rails 64 and 68 over the rail portion 42 for the scrap-charging machine, and their alignment with the vessels 18 and 20 also is apparent from FIG. 2. Furthermore, FIG. 2 shows how the trolley rails 102 are situated across the teeming aisle 24 over the mold car rails 88 and 90 and the steel car rails 78 situated therebetween.

It is to be noted in this connection that a steel car traveling, for example, to the right, as viewed in FIG. 2, along the rail 76 can receive steel from one or the other of the converters and then can travel out of the building along the connecting rail 86 to the other steel car rails 78 so as to return therealong back into the building, and one or the other of the trolleys 100 can then be used for transferring the teeming ladle to mold cars on the tracks 88 and 90. Then the steel car can continue to travel in the same direction along the rail 78 to the connecting rails 84 and along the latter back to the rail 76 so that in this way the rails 76 and 78 together with the connecting rails 84 and 86 form a closed loop along which the steel cars can travel.

FIG. 2 also shows the bins 104 which contain materials such as lime, spar, and the like to be charged into the converters in a well known manner, and also FIG. 2 schematically indicates the bins 106 from which cooling scrap is charged into the converters during operation thereof.

Figure 3:
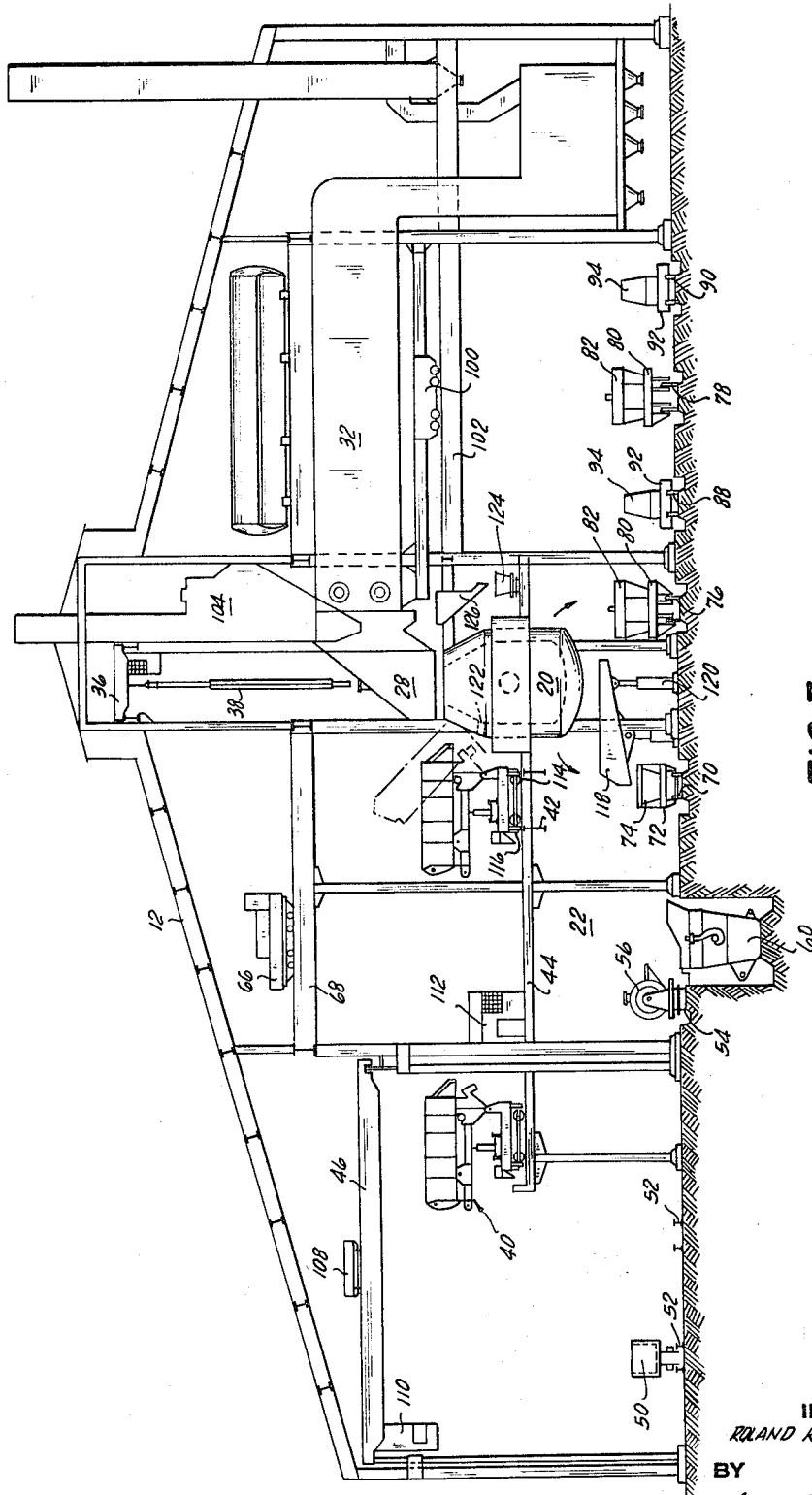
FIG. 3 is a transverse schematic elevation of the plant taken along line 3—3 of FIG. 2 in the direction of the arrows.

Referring to FIG. 3, there is indicated at the left thereof the crane 46 for the scrap charging operations, this crane carrying a trolley 108 and being provided with a pulpit 110 for the operator of the crane, so that the extent to which complications of this latter type are avoided by elimination of cranes from the plant of the invention is readily apparent. The scrap-charging machine 40 is provided with sets of wheels 114 and 116 which are perpendicularly oriented with respect to each other and which can be alternately lowered and raised through any suitable hydraulic structure or the like, so that the wheels 116 can be used for the track portion 42 while the wheels 114 can be used for the track portion 44. FIG. 3 also indicates an enclosure 112 situated beyond the track portion 44 but at an elevation high enough to accommodate an operator who can oversee the various operations taking place in the charging aisle. It is to be noted, however, that because of the simplicity of the structure of the invention it readily lends itself to automatic operation, and a fully automatic operation of the plant can be provided, and in this case the automatic controls could be situated in the enclosure 112 so as to be checked upon from time to time and so as to be regulated in order to vary the operations.

The charging machine 40 is provided with a hydraulic structure capable of tilting the scrap-containing structure to the dot-dash line position indicated in FIG. 3, and of course at this time the upper open end of the converter 20 is tilted to the left, as viewed in FIG. 3, to receive the charge of scrap. The converter is supported on suitable trunnions and is turned in either direction in a well known manner.

In accordance with one of the features of the invention, there is situated beneath each converter a slag runner 118 in the form of a suitable trough having a discharge end situated over the slag car rail 70 so that when a slag pot 74 carried by the slag car 72 is situated beneath the left discharge end of the runner 118, as viewed in FIG. 3, slag can be delivered directly into the pot 74 and then transferred directly out of the plant without using any transfer cars. The runner 118 is supported for tilting movement and a suitable hydraulic structure 120 is provided for tilting the runner 118. In addition, each of the converters is provided with a tap hole 122 through which the slag will flow into the slag runner when the converter is tilted in a counterclockwise direction, as viewed in FIG. 3.

As is also apparent from FIG. 3, the torpedo car rail 54 is capable of locating the torpedo car 56 in alignment with the ladle 60 which is situated in a pit which extends beneath the surface of the charging aisle 22. Situated over the ladle 60 are the stationary trolley rails 68 which support the trolley 66 provided with suitable winches and cables to raise the ladle 60 and move it to the vessel 20 into which the charge is poured after the charging machine 40 has been moved away from the converter 20. The same operations are capable of being performed with the converter 18.

FIG. 3 also illustrates how, when the converter 20 is tilted in a clockwise direction, as viewed in FIG. 3, the steel can be poured out of the mouth of the converter over the lip thereof directly into the teeming ladle 82 which can then be transported from the track 76 to the track 78 situated beneath the trolley rails 102 on which the trolley 100 is situated for operating suitable winches and cables to raise the teeming ladle 82 and move it toward one or the other of the mold car rails 88 and 90 so that the steel can be poured into the ingot molds 94.

FIG. 3 also shows various additional components which do not form part of the invention such as the lance 38 and the lance-supporting trolley 36, the supply bin 104, and the apparatus 32 for receiving the gases from the hood 28. In addition there is shown in FIG. 3 a receiver 124 capable of receiving dust and other foreign bodies which are collected in the hopper 126.

FIG. 3 shows in particular the various columns which support the structures at suitable elevations, and any desired arrangement of columns and other building structures such as the beams, trusses, and the like may be used for the building 12 of the invention.

Referring to FIG. 4, it will be seen that the various car rails are situated directly on the floor of the charging and teeming aisles, so that the cars such as the torpedo car 56, the slag car 72, and the steel car 80 shown in FIG. 4 are situated directly on the floor of these aisles. However, the charging ladles 58 and 60 are situated in pits at a lower elevation.

At the elevation which is just above the elevation of the floor of the charging aisle is situated the rails for the scrap-charging machine 40 which, as is shown in FIG. 4, can be provided with a pair of charging units 40a and 40b either one of which may be used for charging scrap into the converters.

At the next higher elevation are situated the stationary trolley rails 102 for the pair of trolleys 100 which operate the winches and cables, as diagrammatically shown at the right of FIG. 4, for raising the teeming ladle 82 and transporting it to a mold on a car at one or the other of the mold rails.

Situated at an even higher elevation, in alignment with the converters, are the rails which support the trolleys 62 and 66 which are provided with the winches and cables for raising and transporting as well as tilting the charging ladles 58 and 60.

FIG. 4 also illustrates the bins 104 which contain the fluxing constituents and the cooling scrap bins 106.

Also apparent from FIG. 4 is the channel-shaped cross sectional configuration of the slag runners 118 which it will be noted are in transverse alignment with the ladles 58 and 60 as well as with the converters 18 and 20 and the trolleys 62 and 66.

It will thus be seen that with the structure of the invention a steel plant which is simple and inexpensive to construct and operate is provided. All of the car rail means extend exclusively longitudinally of the charging and teeming aisles, while all of the trolley rail means are stationary and no cranes are required in the steel plant of the invention. The charging and teeming ladles are transported exclusively by trolley means which ride along stationary rails, and even the scrap-charging machine rides along a stationary rail means.

The various cars and trolleys are all of a conventional well known construction and may be electrically driven.

Instead of pouring the steel into ingot molds, the plant can be adapted to deliver the steel to a continuous casting structure.

I claim:

1. In a craneless steel plant, an elongated charging aisle and an elongated teeming aisle extending parallel to said charging aisle, a converter situated between said aisles, slag-transporting means extending along said charging aisle and consisting of slag cars for receiving slag from the converter and rails guiding said cars for movement and extending exclusively longitudinally of said charging aisle, so that there are no slag-transfer cars or rails therefor to move slag transversely of said charging aisle, and steel transporting means consisting of cars carrying teeming ladles for receiving steel from the converter and rails extending exclusively longitudinally of said teeming aisle to support the latter cars for movement only longitudinally of said teeming aisle, so that there are no transfer cars or rails therefor for transporting steel transversely of said teeming aisle.

2. In a steel plant as recited in claim 1, torpedo cars adapted to move along said charging aisle for delivering pig iron to a charging ladle in said charging aisle, and additional rails situated in said charging aisle and extending only longitudinally thereof for guiding the torpedo cars exclusively for longitudinal movement of said charging aisle.

3. In a plant as recited in claim 1, mold-carrying cars situated in said teeming aisle, and additional rails extending exclusively longtiudinally of said teeming aisle to guide said mold-carrying cars for movement therein.

4. In a craneless steel plant, a converter, a charging aisle extending longitudinally of the plant on one side of the converter, a teeming aisle extending longitudinally of the plant parallel to said charging aisle and on the opposite side of the converter, a plurality of car rail means situated in both of said aisles, and all of the car rail means which are situated in said aisles extending exclusively longitudinally thereof, so that said aisles do not have any car rails extending transversely of said aisles, said plurality of rail means including torpedo car rail means in said charging aisle for guiding a torpedo car which delivers pig iron to a charging ladle and slag car rail means in said charging aisle for guiding slag cars which receive slag from the converter to transport the slag out of the plant, and said plurality of rail means in said teeming aisle including steel car rail means for guiding cars carrying teeming ladles for movement longitudinally of said teeming aisle and mold car rail means for guiding mold-carrying cars for movement longitudinally of said teeming aisle, stationary trolley rail means situated over and extending transversely of said charging aisle, trolley means carried by said latter rail means for transporting a charging ladle to and from said converter, stationary trolley rail means situated over and extending transversely of said teeming aisle, and trolley means carried by said latter stationary trolley rail means for transporting a teeming ladle from a steel car toward and away from a mold car.

5. In a plant as recited in claim 4, said steel car rail means including a pair of parallel rails extending longitudinally of said teeming aisle and a pair of connecting rails situated distance from and in opposite directions from said converter, respectively, and each interconnecting said pair of parallel rails, so that a steel car can move in one direction along one of said parallel rails, then along one of said connecting rails to the other of said parallel rails, then in an opposite direction along the other of said parallel rails to the other connecting rail, and along the latter back to said one parallel rail to move again in said one direction therealong, whereby said steel cars can move in a closed loop.

6. In a craneless steel plant, a converter, a charging aisle extending longitudinally of the plane along one side of the converter, a scrap-charging machine for delivering scrap to said converter, and stationary rail means situated over said charging aisle for guiding said scrap-charging machine to and from said converter.

7. In ap lant as recited in claim 6, said rail means having one portion extending transversely of said charging aisle, and a second portion extending longitudinally of said charging aisle.

8. In a plant as recited in claim 7, additional stationary rail means situated at an elevation higher than said rail means for said scrap-charging machine, extending transversely of said charging aisle, and aligned with said converter, and trolley means guiding for movement by said additional rail means for transporting a charging ladle to and from said converter.

9. In a steel plant, a converter, a charging aisle extending longitudinally of the plant on one side of said converter, a slag-car rail extending longitudinally of said charging aisle adjacent said converter for supporting a slag-pot carrying car for movement longitudinally of said charging aisle, and a slag runner situated beneath said converter and having a discharge end located over said slag-car rail, so that when said converter is tilted toward said charging aisle slag in said converter can be delivered to said runner to flow therealong into the slag-pot of a slag car on said slag-car rail.

10. In a plant as recited in claim 9, a teeming aisle extending parallel to said charging aisle and situated on the side of said converter opposite from said charging aisle, a steel car rail extending along said teeming aisle, longitudinally thereof, adjacent said converter, and a steel car on said steel car rail and carrying a teeming ladle for receiving steel from said converter when the latter is tilted in a direction opposite to that in which said converter is tilted for delivering slag to said runner.

References Cited

UNITED STATES PATENTS

| | | | |
|---|---|---|---|
| 3,331,681 | 7/1967 | Mobley | 266—34 XR |
| 314,768 | 3/1885 | Whiting | 22—64 |
| 627,835 | 6/1899 | Wellman | 22—64 |
| 935,964 | 10/1909 | Cromwell | 266—13 |
| 2,799,492 | 7/1957 | Hobenreich | 266—13 |
| 3,093,253 | 6/1963 | McFeaters et al. | 266—13 X |
| 3,253,723 | 5/1966 | Calderon | 214—18 |

FOREIGN PATENTS 919,358  11/1946  France.

J. SPENCER OVERHOLSER, *Primary Examiner.*

R. S. ANNEAR, *Assistant Examiner.*